United States Patent
Lenef et al.

(10) Patent No.: US 12,506,319 B2
(45) Date of Patent: Dec. 23, 2025

(54) OPTOELECTRONIC SEMICONDUCTOR DEVICE AND GLASSES

(71) Applicant: OSRAM Opto Semiconductors GmbH, Regensburg (DE)

(72) Inventors: Alan Lenef, Belmont, MA (US); Abdullah Gok, Allston, MA (US); Jörg Erich Sorg, Regensburg (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 820 days.

(21) Appl. No.: 17/482,740

(22) Filed: Sep. 23, 2021

(65) Prior Publication Data
US 2023/0092838 A1    Mar. 23, 2023

(51) Int. Cl.
*H01S 5/00* (2006.01)
*G01B 9/02* (2022.01)
(Continued)

(52) U.S. Cl.
CPC ............ *H01S 5/0028* (2013.01); *G02B 6/125* (2013.01); *G02B 27/0172* (2013.01); *H01S 5/0268* (2013.01); *G01B 9/02094* (2013.01); *G02B 6/12004* (2013.01); *G02B 6/12007* (2013.01); *G02B 2006/1209* (2013.01);
(Continued)

(58) Field of Classification Search
CPC .... H01S 5/0028; H01S 5/0268; H01S 5/4093; H01S 5/00; H01S 5/026; H01S 5/40; G02B 6/125; G02B 2006/12119; G02B 6/12007; G02B 27/0172; G02B 6/12004; G02B 6/2804; G02B 6/4206; G02B 2006/1209; G02B 2006/12121; G02B 2006/12164; G02B 2027/0178; G02B 6/1228;
(Continued)

(56) References Cited

U.S. PATENT DOCUMENTS 5,724,463 A * 3/1998 Deacon .................. G02F 1/2955
385/47
5,802,222 A * 9/1998 Rasch ................ G02B 26/0808
385/9
(Continued)

FOREIGN PATENT DOCUMENTS

JP    2000275480 A  * 10/2000
JP    2004170668 A  *  6/2004
(Continued)

OTHER PUBLICATIONS

JP-2000275480-A English Translation (Year: 2000).*
(Continued)

*Primary Examiner* — Uyen Chau N Le
*Assistant Examiner* — Darby M. Thomason
(74) *Attorney, Agent, or Firm* — MH2 Technology Law Group LLP (57) ABSTRACT

In at least one embodiment, the optoelectronic semiconductor device comprises a carrier, a first semiconductor laser configured to emit a first laser radiation and applied on the carrier, and a multi-mode waveguide configured to guide the first laser radiation and also applied on the carrier, wherein the multi-mode waveguide comprises at least one furcation and a plurality of branches connected by the at least one furcation.

18 Claims, 9 Drawing Sheets

(51) Int. Cl.
| | |
|---|---|
| *G02B 6/12* | (2006.01) |
| *G02B 6/122* | (2006.01) |
| *G02B 6/125* | (2006.01) |
| *G02B 6/28* | (2006.01) |
| *G02B 6/42* | (2006.01) |
| *G02B 27/01* | (2006.01) |
| *H01S 5/026* | (2006.01) |
| *H01S 5/40* | (2006.01) |

(52) U.S. Cl.
CPC ............... *G02B 2006/12119* (2013.01); *G02B 2006/12121* (2013.01); *G02B 2006/12164* (2013.01); *G02B 6/1228* (2013.01); *G02B 6/2804* (2013.01); *G02B 6/4206* (2013.01); *G02B 2027/0178* (2013.01); *H01S 5/4093* (2013.01)

(58) Field of Classification Search
CPC .......... G02B 27/01; G02B 6/12; G02B 6/122; G01B 9/02094
See application file for complete search history.

(56) References Cited

U.S. PATENT DOCUMENTS

| | | | | |
|---|---|---|---|---|
| 6,832,013 | B1* | 12/2004 | Kuhmann | G02B 6/12004 385/52 |
| 7,805,037 | B1 | 9/2010 | Van Der Vliet et al. | |
| 11,085,998 | B2* | 8/2021 | Sayyah | G01S 7/4818 |
| 11,360,268 | B1* | 6/2022 | Ling | G02B 6/2938 |
| 2003/0007535 | A1 | 1/2003 | Haase et al. | |
| 2003/0174940 | A1* | 9/2003 | Charlton | G02F 1/365 385/27 |
| 2004/0042377 | A1* | 3/2004 | Nikolai | G02B 6/12004 369/112.09 |
| 2010/0246612 | A1 | 9/2010 | Shimizu | |
| 2014/0140091 | A1* | 5/2014 | Vasylyev | G02B 6/0065 362/606 |
| 2018/0372940 | A1* | 12/2018 | Ishii | G02B 27/0905 |
| 2020/0069225 | A1 | 3/2020 | Vizbaras et al. | |
| 2020/0201049 | A1* | 6/2020 | Ukai | G02B 27/0172 |
| 2021/0157056 | A1* | 5/2021 | Butler | G02B 6/30 |

FOREIGN PATENT DOCUMENTS

| | | | | |
|---|---|---|---|---|
| JP | 2012004279 | A | * 1/2012 | |
| JP | 2019207976 | A | * 12/2019 | ........... G02B 6/1221 |
| JP | 2020204642 | A | 12/2020 | |

OTHER PUBLICATIONS

JP-2019207976-A English Translation (Year: 2019).*
Lenef et al., "Thermodynamics of Light Extraction from Luminescent Materials", ECS Journal of Solid State Science and Technology, 2018, vol. 7, No. 1, pp. R3211-R3226.
Romero-García, et al., "Photonic integrated circuits for multicolor laser engines", Proceedings of SPIE, Mar. 2, 2017, vol. 10108, 12 pages.
International Search Report and Written Opinion in International Application No. PCT/EP2022/074811 mailed on Nov. 29, 2022, 14 pages.

* cited by examiner

| | D w×h×l (μm) | P₁ (x, y) (μm) | P₂ (x, y) (μm) | P₃ (x, y) (μm) | P₄ (x, y) (μm) | $\theta_{max}$ (°) | $\rho_{min}$ (μm) | $\theta_B$ (°) | $T_C$ |
|---|---|---|---|---|---|---|---|---|---|
| 2-branch | 20×3×50 | (10, -25) | (35, -25) | (35, 0) | (60, 0) | 45.0 | 26.1 | 34.5 | 0.092 |
| 2-branch | 20×3×80 | (10, -25) | (50, -25) | (50, 0) | (90, 0) | 32.0 | 56.5 | 23.3 | 0.058 |
| 2-branch | 20×3×120 | (10, -25) | (90, -25) | (90, 0) | (130, 0) | 28.3 | 68.2 | 13.0 | 0.910 |
| 3-branch | 20×3×120 | (10, -30) | (90, -30) | (90, 0) | (130, 0) | 27.9 | 58.4 | 21.4 | 0.879 |
| 3-branch | 3×3×120 | (10, -30) | (90, -30) | (90, 0) | (130, 0) | 27.9 | 58.4 | 18.2 | 0.778 |

FIG 20

OPTOELECTRONIC SEMICONDUCTOR DEVICE AND GLASSES

FIELD

An optoelectronic semiconductor device is provided. Further, glasses comprising such an optoelectronic semiconductor device are also provided.

BACKGROUND

An article by S. Romero-Garcia et al., entitled "Photonic integrated circuits for multi-color laser engines", published in the Proceeding of SPIE, on Mar. 2, 2017, discloses photonic circuits.

A problem to be solved is to provide an optoelectronic semiconductor device that has improved emission characteristics.

SUMMARY

This object is achieved, inter alia, by an optoelectronic semiconductor device and by glasses as defined in the independent patent claims. Exemplary further developments constitute the subject-matter of the dependent claims.

According to at least one embodiment, the optoelectronic semiconductor device comprises a carrier. For example, the carrier comprises a thermally conductive material like a ceramic, in particular AlN. It is possible that the carrier comprises conductor tracks and/or a circuitry.

According to at least one embodiment, the optoelectronic semiconductor device comprises one or a plurality of semiconductor lasers. The at least one semiconductor laser is configured to emit laser radiation. Moreover, the at least one semiconductor laser is applied on the carrier, for example, by means of soldering. For example, the at least one semiconductor laser is a laser diode, LD for short. If there is a plurality of the semiconductor lasers, all the semiconductor lasers can be of the same type, or there are different types of semiconductor lasers, for example, to produce red, green and blue light, RGB for short.

In the following, reference may be made to a first semiconductor laser and to a second semiconductor laser. In this respect, the terms 'first' and 'second' refer to an enumeration, and all the features disclosed for the 'semiconductor laser' consequently apply in the same manner for the 'first semiconductor laser' as well as for the 'second semiconductor laser'.

According to at least one embodiment, the optoelectronic semiconductor device comprises one or a plurality of multi-mode waveguides. The at least one multi-mode waveguide is configured to guide the laser radiation. The multi-mode waveguide is applied on the carrier, too, for example, by means of soldering.

According to at least one embodiment, the multi-mode waveguide comprises one or a plurality of furcations and a plurality of branches. The branches are connected with each other by the at least one furcation.

In at least one embodiment, the optoelectronic semiconductor device comprises a carrier, a first semiconductor laser configured to emit a first laser radiation and applied on the carrier, and a multi-mode waveguide configured to guide the first laser radiation and also applied on the carrier. The multi-mode waveguide comprises at least one furcation and a plurality of branches connected by the at least one furcation.

For example, in the optoelectronic semiconductor device the multi-mode waveguide is provided with an optional mode-mixer and provides an alignment tolerant LD butt-coupling for RGB imaging and projection applications, particularly for AR/VR applications. AR means augmented reality and VR means virtual reality.

Thus, an alignment tolerant planar light circuit RGB laser combiner and source can be provided.

In mobile, near-to-eye head up displays, for example, for augmented reality and/or virtual reality, and other low-power projection applications, red, green, and blue laser diode outputs often need to be combined into a single emitting port of small emission area so that complex compensating electronic algorithms and/or beam-displacing optics can be avoided. In this way, images can be generated for each color using the same optical path. For example, in augmented reality applications, one can direct the desired RGB light from a single emission point into a light modulator like a liquid crystal on silicon, LCoS for short, or a moving digital mirror device system, DMD system for short, for example. Having multiple emission points for each color implies that there will be different optical paths into and out of the light modulators which complicate the final image generation in the waveguide combiner which projects the image into the viewer's eye.

To solve the problem of having single or multiple, but very closely spaced, emission point(s) for RGB output, integrated waveguide approaches may be considered, especially for augmented reality/virtual reality applications. To avoid terminology problems, the optical waveguide circuit that combines multiple laser outputs is called a 'planar light circuit' or PLC. This is to differentiate from the 'waveguide combiner' structure in AR/VR glasses that spread the image information over the surface of the glasses, enhancing the eyebox.

Unfortunately, most current PLC approaches assume that the emission point must be single mode to avoid more complex far-field patterns from multi-mode waveguide structures. This means that LD alignment into a single mode waveguide is very difficult, requiring positioning of the LD emission points to well below one wavelength, that is, well below 1 µm. Misalignment causes significant efficiency losses. The high sensitivity to alignment can also cause low production yields.

A second problem of single mode waveguides is that combining multiple waveguides into a single waveguide can lead to significant efficiency losses. Thus, many PLC approaches do not actually combine RGB waveguides to a single waveguide; rather they simply bring the output of each R, G, and B waveguide close together at the emission side. But the desire for a true single emission point is not achieved.

A third problem, especially if LDs are butt-coupled to the waveguide inputs of the PLC, is that the waveguide facets may direct laser radiation back into the LD. This feedback can cause LD instabilities or force LDs to operate in single, or a few, mode states. The loss of strong multimode operation, characteristic of higher power edge-emitting lasers, EELs for short, and larger aperture vertical cavity surface emitting lasers, VCSELs for short, will significantly increase the coherence length of the laser, leading to increased coherent artifacts and laser speckle in the image projected onto the retina, for example.

Single mode output also has full spatial coherence, which will allow for full contrast of such coherence effects in the image. Speckle and coherent artifacts can occur in both direct imaging LCoS and DMD spatial light modulators and in laser beam scanning systems, LBS for short, with one-dimensional or two-dimensional waveguide combiners. Retinal scanning systems with holographic mirrors in glasses can also have coherent artifacts, but less than LBS with waveguide combiners.

By means of the optoelectronic semiconductor device described herein, and its various embodiments, one or more of these problems with current PLC structures used for laser beam combining are solved. In one embodiment, lateral LD alignment tolerances can be relaxed to a few µm, while achieving high efficiency and providing a true single emission point for the output radiation. In another embodiment, the input coupling structure can reduce feedback into the LD. Due to the multi-mode waveguide approach of the PLC structures described herein, all of these embodiments have some potential to reduce spatial coherence and may be especially relevant for reducing speckle and interference artifacts in scanning micro-electromechanical, MEM, mirror AR/VR systems.

Finally, the optoelectronic semiconductor device described herein can make use of a standard lithographic semiconductor type of processing which allows for ease of fabrication and inclusion of alignment fiducials or physical features.

With the optoelectronic semiconductor device described herein, several advantages can be achieved:
a) The optoelectronic semiconductor device can use a wafer level PLC that integrates with LD dies on a single platform.
b) The optoelectronic semiconductor device can be produced using simple photolithography fabrication approaches which lead to cost-effective devices.
c) The sizes of the PLC can be smaller than PLC approaches currently on the market.
d) By means of the optoelectronic semiconductor device the alignment tolerance of the LD with respect to the PLC inputs can be relaxed; for example, a LD lateral adjustment of ±2 µm with respect to the center of the input waveguide structure has only negligible impact on coupling efficiency.
e) The optoelectronic semiconductor device makes use of a mode-mixer to eliminate the dependence on LD alignment to the final emission surface mode structure, making alignment deviations that occur during manufacturing to have minimal influence on the device far-field specifications; further, this allows for complete filling of output waveguide modes to reduce spatial coherence effects.

Alternatively, use of the multi-mode guide without mode-mixing structures can provide relaxation of LD alignment tolerances in some cases. This is when the optical system in the AR/VR system can compensate for small differences in PLC emission point positions, such as by making small timing adjustments for R, G, and B lasers in a scanning mirror system. This is because the output of a non-scattering PLC can be just a shifted and distorted image of the input LD field. If the relay optics magnification such that the waveguide output facet dimensions remain at or below the eye resolution, one will not perceive such distortions caused by the waveguide propagation. The lower magnification of the AR/VR relay optics can also benefit the case of the mode-mixer which can cause more complex far-field patterns, but the speckle-like reimaged waveguide output facet fields will not be resolved by the eye.

The optoelectronic semiconductor device described herein is based, inter alia, on one or several of the following concepts to relax LD alignment tolerances for butt-coupling of laser radiation into a PLC laser beam combiner so that a practical device results:

1. The optoelectronic semiconductor device uses a multi-mode waveguide to significantly reduce tolerance restrictions on LD alignment. This can greatly increase manufacturing yields.
2. Because of the multi-mode configuration, directional evanescent couplers are more difficult to design; the optoelectronic semiconductor device uses direct combining which in the present case can yield high efficiency.
3. By introducing an optional engineered scattering structure within the waveguide, the input field from the LD at various positions and orientations may be stochastically scattered uniformly into all waveguide modes, generating a more uniform, but possibly speckle-like, near-field. This may be beneficial in some cases, providing a statistically uniform far-field distribution.
4. The waveguides can be fabricated using high refractive index materials for the core to have a large index contrast between substrate and cladding materials. This increases confinement and a number of allowable modes for a given cross-section area. The larger mode number further helps to relax alignment issues and relaxes constraints on input coupling structure designs. This will further aid in reduction of spatial coherence. The high index contrast is achieved by etching of deposited high index materials such as $Si_3N_4$ on fused silica or related materials, followed by standard lithography and dry etching processes.

In addition, some of the embodiments have additional technical features that may further help to solve the problems stated above:
i) Anti-refection coatings can be added to input and output surfaces of the PLC waveguides. This will further increase efficiency and minimize laser feedback; alternatively, sloped input facets can also reduce laser feedback and can increase efficiency if making use of Brewster angle effects for EELs.
ii) Several input facet coupling designs reduce alignment tolerance issues, including tapers or possibly inverse taper structures, lens type structures, and large rectangular guides, if a square emission cross-section is not required.
iii) Increasing the length in the output waveguide helps to dephase the waveguide modes; in the presence of multi-mode lasers, for example, with a broad bandwidth. This will decrease spatial transverse coherence at the waveguide output, helping to reduce speckle and coherent artifacts.
iv) The PLC is inverted and bonded to the same substrate as the LDs, which are also inverted, that is, ridge side down. This allows passive alignment of the LD emission points to the center of the waveguide inputs on the PLC.
v) Waveguides can be made from a number of materials including $Si_3N_4$, GaN, $HfO_2$, $LiNbO_3$, $Ta_2O_5$, $Al_2O_3$, AlN, and other etchable related higher refractive index materials.

While the primary application of the optoelectronic semiconductor device is in AR/VR glasses, it can be used for other applications requiring the combination of multiple EELs or VCSELs into a single output. In many cases, the AR/VR system of consideration is a scanning micro-electromechanical, MEM, mirror system.

According to at least one embodiment, the optoelectronic semiconductor device further comprises one or a plurality of second semiconductor lasers. Then at least one second semiconductor laser is configured to emit at least one second laser radiation. Together with the first semiconductor laser and with two different second semiconductor lasers, the optoelectronic semiconductor device can be an RGB device.

According to at least one embodiment, the multi-mode waveguide comprises at least two first branches configured to receive the first laser radiation and/or at least one second laser radiation. For example, for each one of the semiconductor lasers there is one first branch. Hence, there can be a one-to-one assignment between the first branches and the semiconductor lasers.

According to at least one embodiment, at least one furcation is configured to merge the first laser radiation with the at least one second laser radiation to get a merged laser radiation. In other words, the merged laser radiation comprises all of the first and second laser radiations. That is, the first and second laser radiations may be combined or unified by means of the at least one furcation.

According to at least one embodiment, the multi-mode waveguide comprises exactly one second branch on a side of the at least one furcation facing away from the first semiconductor laser and/or the at least one second semiconductor laser. The second branch is configured to emit the merged laser radiation.

Thus, the at least one first branch may be referred to as an input branch and the at least one second branch may be referred to as an output branch.

According to at least one embodiment, at least one semiconductor laser comprises a laser substrate and a semiconductor layer sequence as well as a first metallization. This may apply for each one of the first and/or second semiconductor lasers. For example, the semiconductor layer sequence is based on AlInGaN or on AlInGaP.

According to at least one embodiment, the semiconductor layer sequence and the first metallization are located on the same side of the laser substrate. For example, the first metallization protrudes beyond the assigned semiconductor layer sequence.

According to at least one embodiment, the first semiconductor laser and/or the at least one second semiconductor laser is an edge-emitting laser. Alternatively, VCSELs are used for the semiconductor lasers, or a combination of EELs and VCSELs.

According to at least one embodiment, the multi-mode waveguide comprises a substrate body and a guidance structure protruding from the substrate body. The guidance structure is configured to guide the first laser radiation and/or the at least one second laser radiation by means of internal total reflection. The guidance structure may be made of a material applied on the substrate body.

According to at least one embodiment, the multi-mode waveguide further comprises a second metallization. For example, the second metallization is configured for soldering.

According to at least one embodiment, the guidance structure and the second metallization are located on the same side of the substrate body. In particular, the substrate body is attached to the carrier so that the guidance structure and the second metallization face the carrier.

According to at least one embodiment, an emission region of the first and/or second semiconductor laser is located close to the carrier to level with the guidance structure. In other words, the semiconductor layer sequence faces the carrier. If the respective semiconductor laser comprises a growth substrate for the semiconductor layer sequence, the growth substrate is located on a side of the semiconductor layer sequence remote from the carrier.

According to at least one embodiment, seen in top view of the guidance structure, the second metallization is located laterally displaced relative to the guidance structure. The same may apply for the first metallization relative to a ridge waveguide of the respective semiconductor layer, if comprising such a ridge waveguide.

According to at least one embodiment, the second metallization projects beyond the guidance structure and is configured to adjust a distance of the guidance structure from the carrier. Alternatively or additionally, the first metallization projects beyond the semiconductor layer sequence and is configured to adjust a distance of the semiconductor layer sequence from the carrier.

According to at least one embodiment, the multi-mode waveguide is configured to merge red, green and blue laser radiation.

According to at least one embodiment, an output region of the multi-mode waveguide has an area of at most 30 µm×30 µm or of at most 20 µm×20 µm.

According to at least one embodiment, the multi-mode waveguide further comprises a scatter region configured to scatter the first laser radiation. For example, the scatter region is located on a side of at least one furcation remote from the first semiconductor laser. As an option, the scatter region can comprise a plurality of randomly distributed scatter centers.

According to at least one embodiment, seen in top view of the multi-mode waveguide, the at least one furcation is of S-shape so that the at least one furcation includes or is composed of a right-turning bend and of a left-turning bend. It is possible that all the furcations are of the same design; alternatively, there can be furcations of different shapes. It is possible that the at least one furcation is of point-symmetric design.

According to at least one embodiment, the optoelectronic semiconductor device comprises a plurality of the furcations. The furcations can merge with the branches at different locations, or all the furcations merge at the same location in the multi-mode waveguide.

According to at least one embodiment, the multi-mode waveguide further comprises an input coupling structure facing the first and/or semiconductor laser. For example, the input coupling structure comprises at least one section in which the respective branch narrows in a direction away from the first semiconductor laser. Alternatively or additionally, the input coupling structure comprises at least one further section in which the respective branch broadens in a direction away from the first semiconductor laser.

According to at least one embodiment, the input coupling structure comprises an input face facing the first semiconductor laser, the input face is tilted relative to a longitudinal axis of the respective branch.

According to at least one embodiment, a number of branches facing the first semiconductor laser is smaller than or is equal to a number of branches located at a side of at least one furcation remote from the first semiconductor laser.

Glasses are additionally provided. The glasses preferably comprise at least one optoelectronic semiconductor device as indicated in connection with at least one of the above-stated embodiments. Features of the optoelectronic semiconductor device are therefore also disclosed for the glasses and vice versa.

In at least one embodiment, the glasses are configured for augmented reality or virtual reality applications. In particular, the glasses comprise one or a plurality of the optoelectronic semiconductor devices. Moreover, the glasses include at least one field of vision illuminated by the at least one optoelectronic semiconductor device.

An optoelectronic semiconductor device and glasses described herein are explained in greater detail below by way of exemplary embodiments with reference to the drawings. Elements which are the same in the individual figures are indicated with the same reference numerals. The relationships between the elements are not shown to scale,

DETAILED DESCRIPTION

FIGS. 1 to 4 illustrate an exemplary embodiment of an optoelectronic semiconductor device 1. The semiconductor device 1 comprises a first semiconductor laser 31 which is, for example, configured to emit red first laser radiation L1. Further, the semiconductor device 1 comprises two second semiconductor lasers 32 which are, for example, configured to emit green and blue second laser radiations L2, respectively. Moreover, the semiconductor device 1 includes a multi-mode waveguide 4 having a guidance structure 43. By means of the guidance structure 43, the first and second laser radiations L1, L2 are merged to a laser radiation L. For this purpose, the guidance structure 43 includes three first branches 41 facing the semiconductor lasers 31, 32. By means of a furcation 40, the three first branches 41 are unified into one second branch 42 that outputs the merged laser radiation L. The multi-mode waveguide 4 can also be referred to as PLC, planar light circuit.

For example, the guidance structure 43 of the multi-mode waveguide 4 is applied on a low refractive index substrate body 44, typically glass or fused silica. Alternatively, the substrate can be, for example, silicon with at least a 1 μm thick layer of $SiO_2$. Preferably, the $SiO_2$ layer should have a thickness of at least 2 μm to ensure high confinement and to avoid losses from evanescent coupling into the the silicon substrate which is also absorbing for visible wavelengths. The guidance structure 43 comprises the three input branches 41 through which the laser radiations L1, L2 are coupled via an input face 49 for each R, G, and B semiconductor laser 31, 32. The three guidance structures 43 make an S-bend where they fuse into a single region, called the combining region or furcation 40. The output branch 42 transmits the light from the combining region to an output facet.

To minimize losses, especially in the combining region, and to have a large angular coupling tolerance, it is desirable to have a high refractive index contrast between the guidance structure 43 and the substrate body 44. For example, the guidance structure 43 can be made from $Si_3N_4$ due to ease of wafer level processing and a refractive index of about 2.06, compared to fused silica for which the refractive index is about 1.46, at a wavelength of 520 nm.

Figure 1:
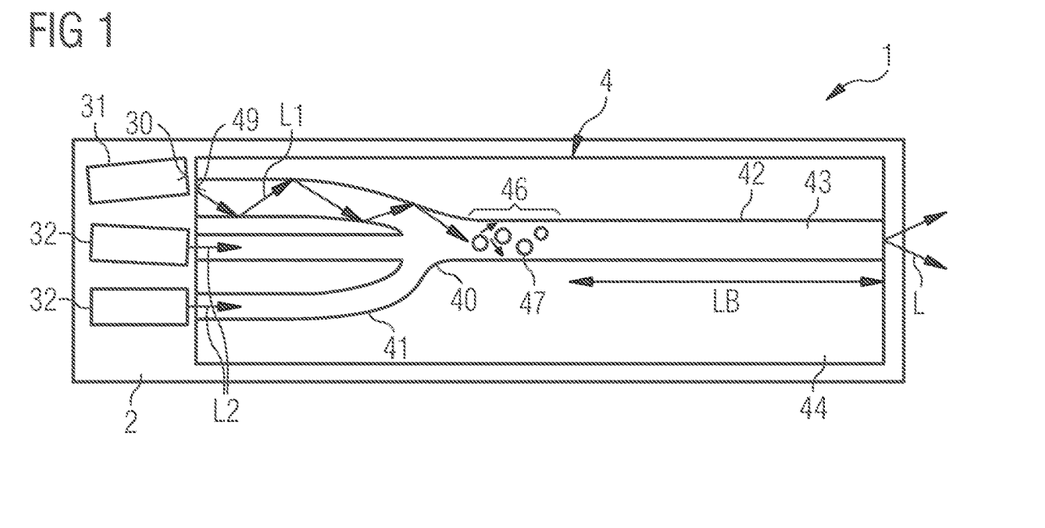
FIGS. 1 and 4 are schematic top views of an exemplary embodiment of an optoelectronic semiconductor device described herein.
Figure 3:
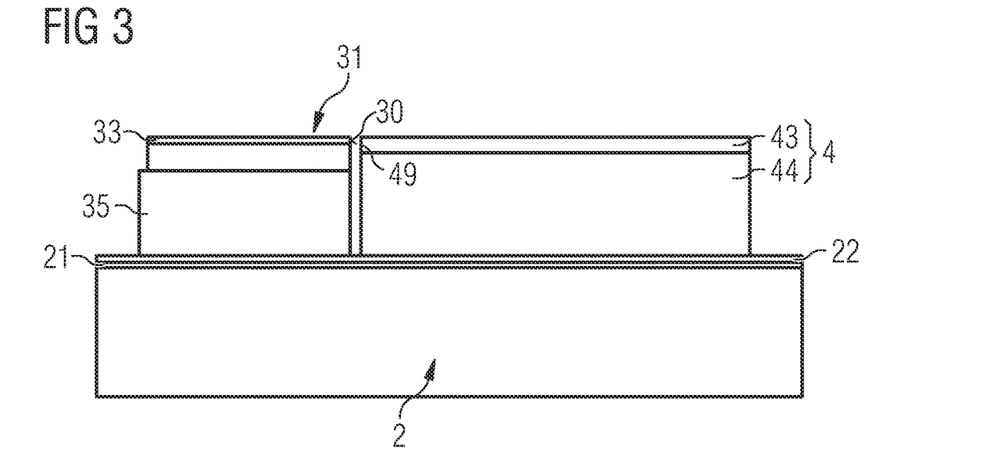
FIG. 3 is a schematic sectional view of the optoelectronic semiconductor device of FIGS. 1 and 4, FIGS. 5 and 6 are schematic diagrams of alignment tolerances of the optoelectronic semiconductor device of FIGS. 1 to 4.

As shown in FIGS. 1 and 3, the semiconductor lasers 31, 32 are butt-coupled to the multi-mode waveguide 4, but in general will have some spacing between the substrate body 44 and the input faces 49, and will not be perfectly aligned with center axes of each first branch 41. For example, the R, G, and B emitting semiconductor lasers 31, 32 are coupled into the first branches 41, where they combine in the direct combination region 40.

One disadvantage of the high index contrast is that the output emission angle is large and may be more difficult to collimate. One can also use a lower index waveguide material such as $Al_2O_3$ or a high index glass deposited on a low index glass substrate to reduce the output angle, but at the cost of reduced confinement and lower number of modes.

For example, the multi-mode waveguide 4 is provided with at least one second metallization 52. In particular, there can be one second metallization 52 along each side of the guidance structure 43 and/or along edges of the substrate body 44, seen in top view, compare FIG. 2.

As an option, a scatter region 46, also referred to as mode-mixing region, follows, which comprises, for example, a plurality of scatter centers 47 that can be fabricated lithographically. An additional propagation length LB in the output branch 42 is desirable to help dephase the modes into which the input light is scattered. The additional propagation length LB follows the scatter region 46. For example, the additional propagation length LB is at least 0.5 mm and/or at most 10 mm.

It is also possible to include a scatter region at the input facets or the output facet. However, if the input facet has a scattering region, this may help with some mode mixing, but may lead to additional losses. On the output side, it may diffuse the output pattern, but does not really accomplish mixing of waveguide modes.

That is, as is also possible in all other exemplary embodiments, the multi-mode waveguide 4 of FIG. 1 may have the optional scatter region 46. The purpose of the scatter region 46 is in particular to scatter modes excited by the incident LD fields to a broader range of bound waveguide modes. The scatter region 46 can have three benefits, for example: First, it can produce a more uniform near-field that is less dependent on the LD alignment on average; second, it can expand the far-field divergence with less directional dependence on LD alignment; and third, it can provide additional spatial incoherence to help reduce some artifacts and speckle caused by various interference effects in the downstream optical components.

To fabricate a useful scatter region 46 without significant impact on waveguide efficiency, preferably the scatter region 46 has a strong forward scattering, but weak back-scattering to minimize losses. The mode-mixing can be accomplished by various approaches that are compatible with lithography methods, such as photolithography. In one example, sub-micron holes as the scatter centers 47 can be etched into the material of the guidance structure 43. Holes having diameters of between 0.3 μm to 0.5 μm, for example, will have strong forward directed scattering. For example, four such holes can be randomly aligned along the direction of propagation, and will induce multiple scattering in the forward direction that will appropriately scatter excitation of a particular superposition of modes from a given input LD position into all available output waveguide modes. Other approaches include random or perturbed wall features. Forming a diffusing surface on the LD input faces 49 can also be done.

The output facet of the second branch 42 is the source for the emitted light L used, for example, by an optical system that follows the semiconductor device 1 downstream, not illustrated. Typically, in particular seen in cross-section, the single output branch 42 should have the same dimensions as the input branches 41 to make sure that all modal excitation on the input branches 41 can be excited in the output branch 42. Making the output branch 42 with a narrower width W than the input branches 41 may result in reflection of energy for certain combinations of input semiconductor laser alignment, creating additional losses. This roughly couples a higher étendue source, due to all the possible semiconductor laser alignment configurations, to a smaller étendue optical system.

In FIG. 3, the RGB semiconductor device 1 is shown in cross-section. Here, RGB ridge lasers 31, 32, which are edge emitting, are each bonded to a laser substrate 35, which could be a sub-mount, also referred to as chip on sub-mount assembly or COSA for short. A height of the laser substrate 35 and the input faces 49 are matched, but can be relaxed compared to a single mode waveguide PLC.

Figure 2:
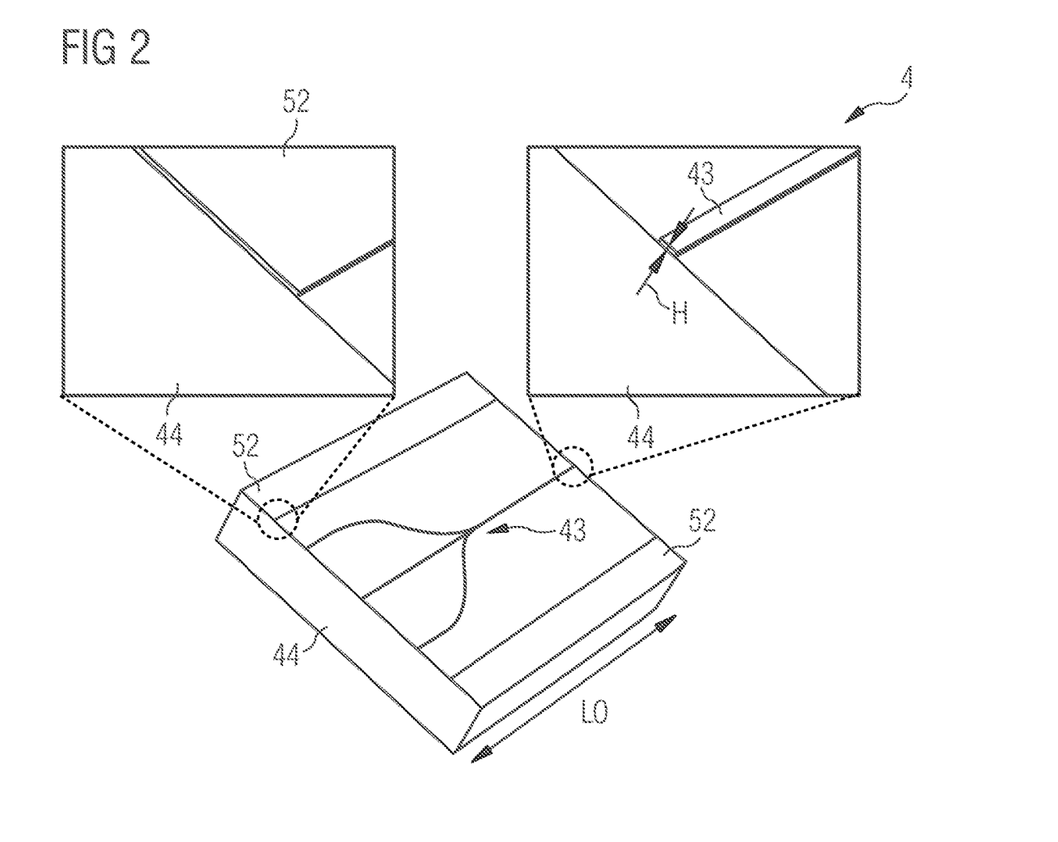
FIG. 2 is a schematic perspective views of the multi-mode waveguide of the optoelectronic semiconductor device of FIGS. 1 and 4.
Figure 4:
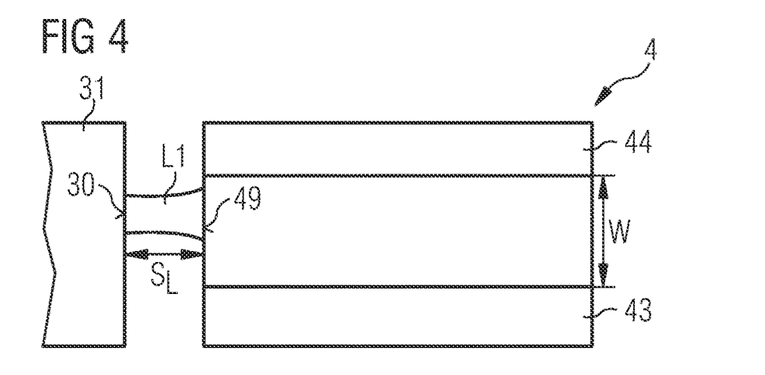

For example, a horizontal alignment tolerance is achieved by making a multi-mode rectangular waveguide input face 49 as shown in FIG. 4. An exemplary width W is 10 μm to 20 μm. However, the emission region need not be rectangular, but could be designed with other shapes, too. A height H of the guidance structure 43, compare FIG. 2, is limited, for example primarily by the ability to make high quality waveguide material coatings. For example, $Si_3N_4$ coatings can be made of thicknesses greater than 1 μm and can be at least 3 μm. The wide guidance structure 43 allows lateral alignment tolerances of the incident LD emission points 30 to be on the order of ±3 μm for W=10 μm, for example, for a typical ridge waveguide LD 31, 32. Note that the wide waveguide can also accommodate some separation of the LD facet 30 and the waveguide input face 49. This separation distance is denoted by SL in FIG. 4.

For example, the emission region 30 of the semiconductor lasers 31, 32 is about 2 μm×1 μm. As with typical ridge waveguide lasers, the input beams L1, L2 would be polarized in the waveguide plane, that is, horizontally. A $Si_3N_4$ straight rectangular ridge waveguide is bounded by a silica substrate on the bottom and the other three surfaces by air, for example, compare FIG. 2. The waveguide cross-section of the branches 41, 42 is, for example, W×H=20 μm×3 μm. For example, $S_L$ is 1.0 μm±0.5 μm. Such a separation distance $S_L$ results, for example, in a nominal coupling efficiency of 78% at $S_L$=0.5 μm. In this case, a representative wavelength may be 550 nm.

Figure 5:
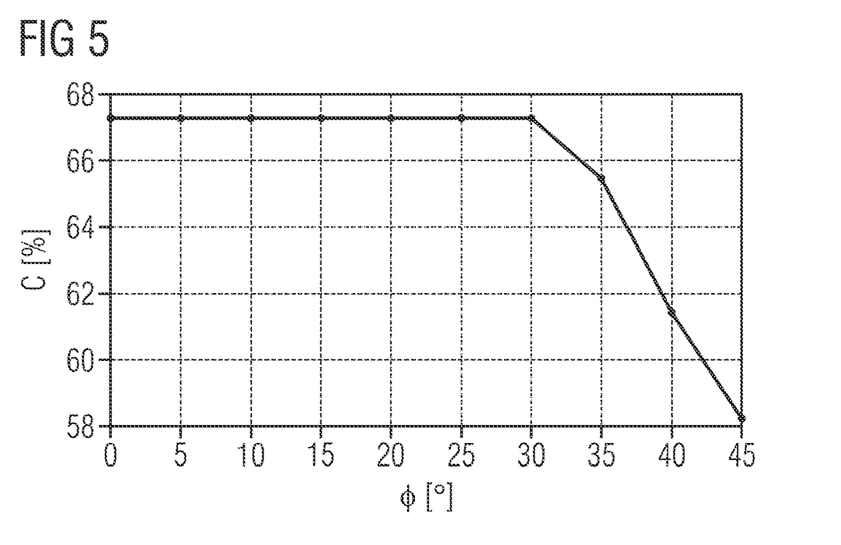
Figure 6:
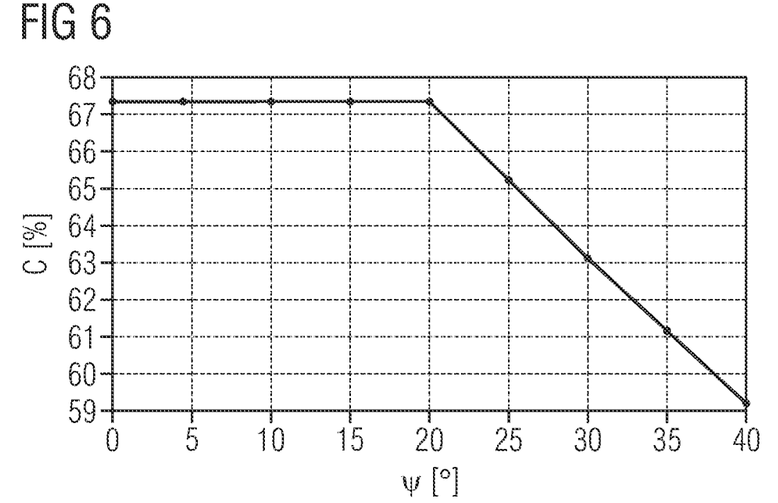

An LD coupling efficiency C is determined by the ratio of power within the waveguide 4 to the incident LD power, compare FIGS. 5 and 6, which show the variation in coupling efficiency C as a function of an azimuthal angle ϕ and an elevation angle ψ. The results show very wide angular accommodation of 30° in the azimuthal plane and 20° in elevation from the waveguide plane.

Figure 7:
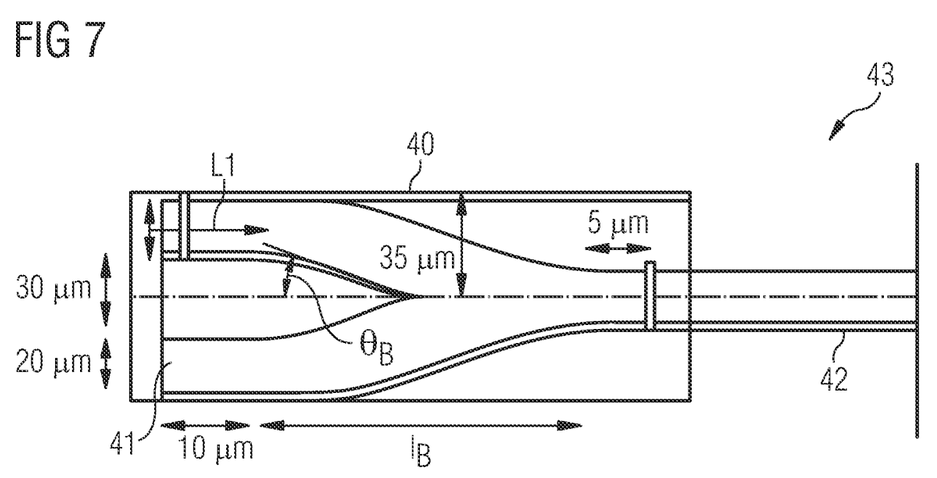
FIG. 7 is a schematic top view of a guidance structure for exemplary embodiments of optoelectronic semiconductor devices described herein.

In FIG. 7, another exemplary embodiment of the guidance structure 43 is illustrated with emphasis on the furcation 40, also referred to as the combining region. The combining region 40 preferably has an S shape, seen in top view, to have smooth curvature variations from the LD input towards the output branch 42. A bending angle $\theta_B$ of the furcation 40 may be a critical parameter for determining the combining losses. For example, $\theta_B<21.4°$ applies for the waveguide design in FIG. 7 which leads to acceptable combining losses of less than 12%. For example, if $\theta_B=23.3°$, then combining losses would be much larger at 95%. By comparing the magnitude of an electric field for $\theta_B=21.4°$ and $\theta_B=23.6°$, the larger bend angle $\theta_B$ may result in internal reflection into other branches within the furcation 40.

For example, the numerical values provided in FIG. 7 apply individually or all together with a tolerance of at most 50% or of at most 25% or of at most 10%. Also shown for two first branches 41 and one second branch 42, the numerical values can analogously apply for guidance structure 43 with other number of first and/or second branches 41, 42. The bend length $l_B$ is, for example, at least 20 μm or of at least 0.2 mm or at least 0.5 mm and/or is at most 2 mm or at most 1 mm.

In practical PLCs where the lateral dimensions of the LDs and/or COSAs have a lower limit of the spacing of the input branches or furcations, typical input furcation lengths would be on the order of at least 200 μm, and typically at least 500 μm. For example, if the furcation spacing were limited to 400 μm, the furcation lengths would be on the order of 1 mm in order to maintain the required bend angles.

In a further possible embodiment, the waveguide emission region is square, and not rectangular. Then, W=H applies. Typical widths W=3 μm. In this case, the coupling efficiency is almost constant over lateral variation of ±1.0 μm, concerning the positions of the semiconductor lasers 31, 32. The S-bend results for the combiner region 40 are close to the rectangular case, with $\theta_B<18°$ being preferred.

Otherwise, the same as for FIGS. 1 to 6 may also apply to FIG. 7, and vice versa.

Figure 8:
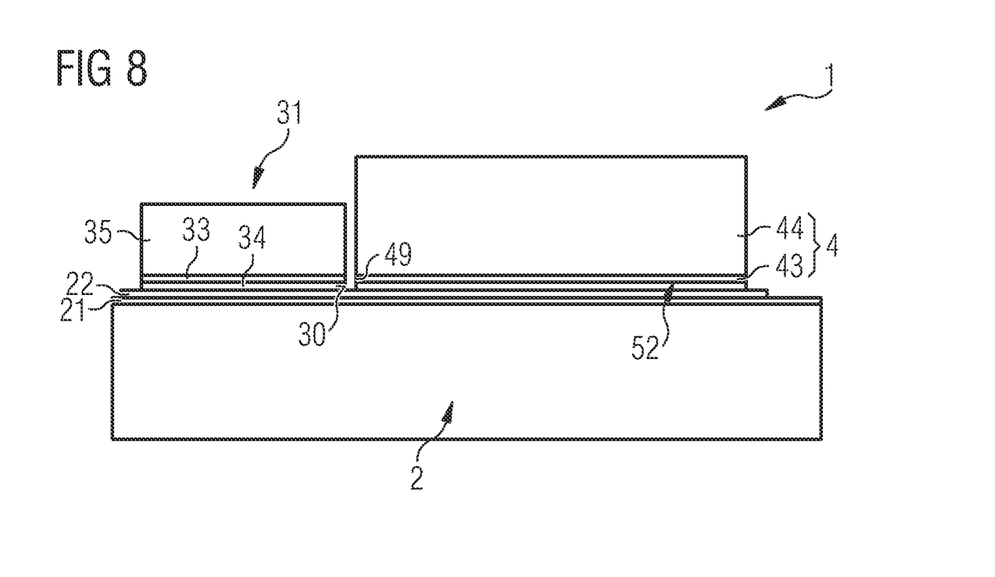
FIG. 8 is a schematic sectional view of an exemplary embodiment of an optoelectronic semiconductor device described herein.

According to FIG. 8, LDs 31, 32 and the PLC 4 are used in a flip-chip configuration to provide passive vertical alignment of LD emission points 30 and waveguide input faces 49. In addition to the waveguide, the waveguide material is also used to make pads which are only for mechanical contacting and have no optical interaction with the guidance structure 43. The pads are typically along the outer regions of the substrate body 44 and can be formed using the same lithography process as the guidance structure 43, compare also FIG. 2. The pads are then coated with at least one second metallization layer 52 for soldering or other bonding processes. As the guidance structure 43 is made by deposition of the dielectric material, its thickness can be highly controlled to within ±10 nm or even better. The pad metallization thickness can also be highly controlled to similar tolerances.

To achieve passive, highly accurate vertical alignment of the at least one emission point 30 and the vertical center of the waveguide input face 49, both the semiconductor lasers 31, 32 and the multi-mode waveguide 4 are flipped as shown in FIG. 8. As with the guidance structure 43, a vertical distance from the first metallization 34 to the emission point 30 can be accurately known to well below 1 μm for similar reasons.

Therefore, by adjusting the metallization thickness and/or bonding thickness of the PLC pads 52, one can precisely match the emission point 30 and the vertical center of the waveguide input face 49 during bonding. Only the flatness of the heat transfer carrier 2, which is, for example, of AlN, and consistency of the solder preform or bonding material thicknesses should be ensured.

Otherwise, the same as for FIGS. 1 to 7 may also apply to FIG. 8, and vice versa.

Figure 9:
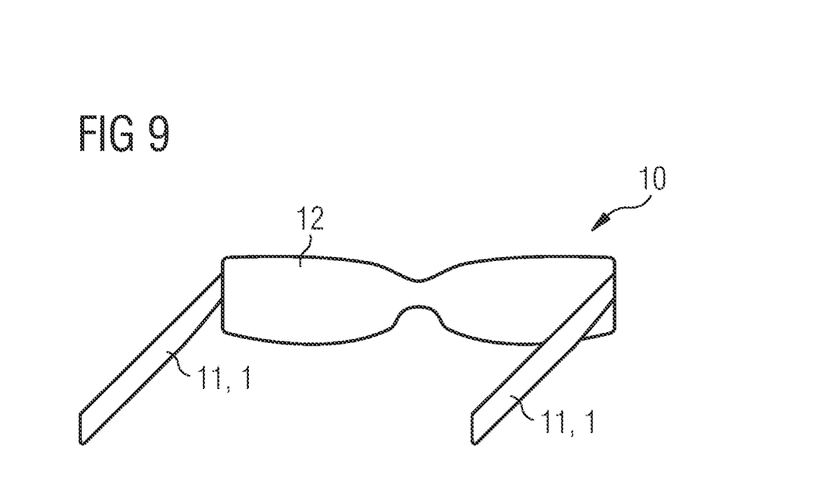
FIG. 9 is a schematic perspective view of an exemplary embodiment of glasses comprising an optoelectronic semiconductor device described herein.
Figure 10:
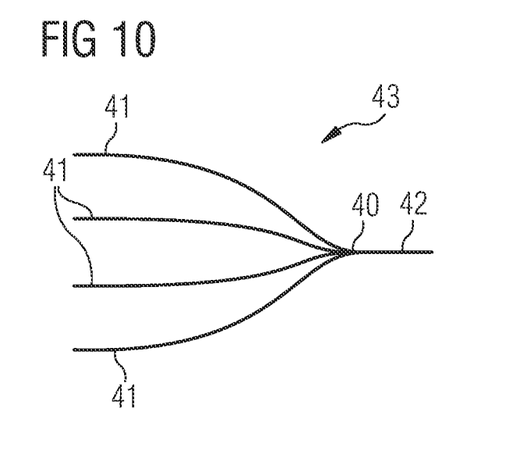
FIGS. 10 to 14 are schematic top views of guidance structures for exemplary embodiments of optoelectronic semiconductor devices described herein.

In FIG. 9, glasses 10 for AR/VR applications are illustrated. The glasses 10 comprise, for example, two fields of vision 12, each illuminated with one of the optoelectronic semiconductor devices 1. For example, the optoelectronic semiconductor devices 1 are accommodated in temple arms 11 of the glasses 10.

With respect to coherence issues in laser scanning AR/VR systems 10 in particular, coherent artifacts and speckle effects can degrade image quality. Coherent artifacts such as Newton ring formation can be caused by inter-optic reflections. For example, a relay optic that transmits a secondary image from a diffuser or micro-lens array plane to a waveguide combiner of the glasses may introduce such artifacts. Calculations based on paraxial Fourier optics indicate that the spatial field profiles formed at the emission region of the multi-mode waveguide 4 may not have any significant effect on these artifacts. Here, only the laser bandwidth and even spectral shape have a significant influence.

For speckle, three mechanisms may be important. The first is from the glasses waveguide combiner, not shown. If the observer's pupils are large enough to capture more than one bounce from said waveguide combiner, then one effectively has a double slit which will produce fine interference fringes in the retina. These will not wash out during scanning as they come from fixed interference points. A second contribution can be from errors in the fabrication of the gratings in 1D or 2D waveguide combiners. The inaccuracies lead to scattering which would have a speckle pattern appearance. A third potential mechanism is from an intermediate micro-lens array, MLA, or diffuser which expands the field-of-view to fill the waveguide combiner aperture.

The multi-mode waveguide 4 described herein could help alleviate some of these problems by making the near-field distribution spatially incoherent.

Otherwise, the same as for FIGS. 1 to 8 may also apply to FIG. 9, and vice versa.

In FIGS. 10 to 14, some possible variations of the guidance structure 43 are illustrated. According to FIG. 10, the input branches 41 are arranged in a mirror symmetric manner relative to a longitudinal axis of the output branch 42. For example, there is an even number of input branches 41. According to FIG. 10, there are four input branches 41. Further, in FIG. 10 there is one single furcation 40.

Figure 11:
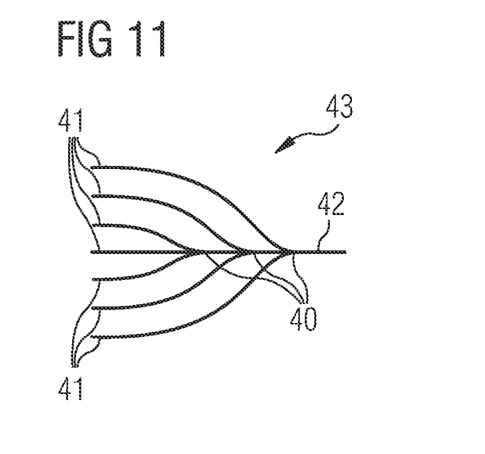

In FIG. 11 it is illustrated that there is a large number of input branches 41 which may be arranged in a symmetric manner, and there is a plurality of the furcations 40. For example, per furcation 40 two or three of the input branches 41 are merged. A distance between adjacent furcation 40 is, for example, at least 30 µm and/or at most 2.0 mm.

Figure 12:
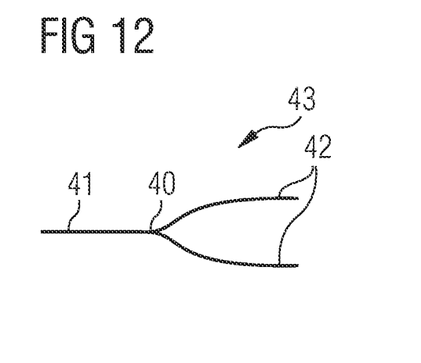

In FIG. 12 it is shown that there is only one input branch 41 configured for a semiconductor laser 31, 32, and there are at least two output branches 42. That is, a kind of beam splitter can be realized.

Figure 13:
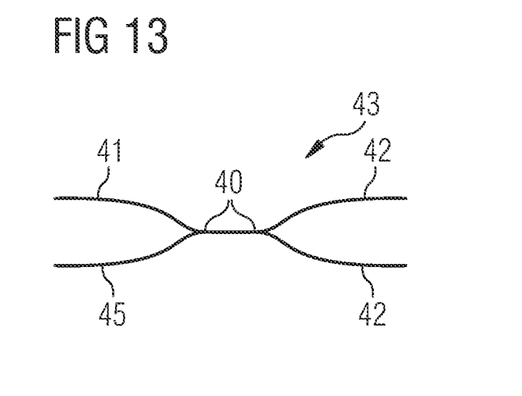

According to FIG. 13, there is only one input branch 41 configured for a semiconductor laser 31, 32, and again there are at least two output branches 42. Further, optionally there is an additional branch 45. For example, the additional branch 45 can be configured for a photo detector. Such a guidance structure 43 may be used in an interferometer set-up.

Figure 14:
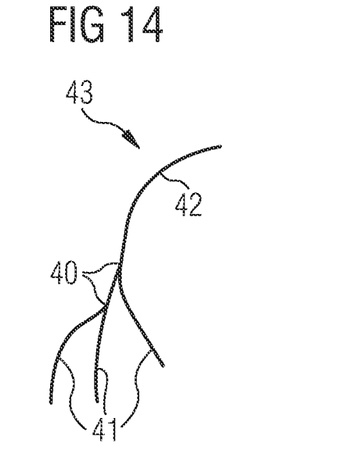

In FIG. 14 it is illustrated that it is not necessary that the output branch 42 and/or the input branches 41 are of straight fashion. That is, for example, the output branch 42 could have a curvature. Further, it is possible that the input branches 41 are not aligned in parallel with each other. Thus, the input branches 41 may receive laser radiation from different directions.

Each one of the guidance structures 43 of FIGS. 10 to 14 can analogously be used in all the exemplary embodiments of the optoelectronic semiconductor device 1.

Otherwise, the same as for FIGS. 1 to 9 may also apply to FIGS. 10 to 14, and vice versa.

Figure 15:
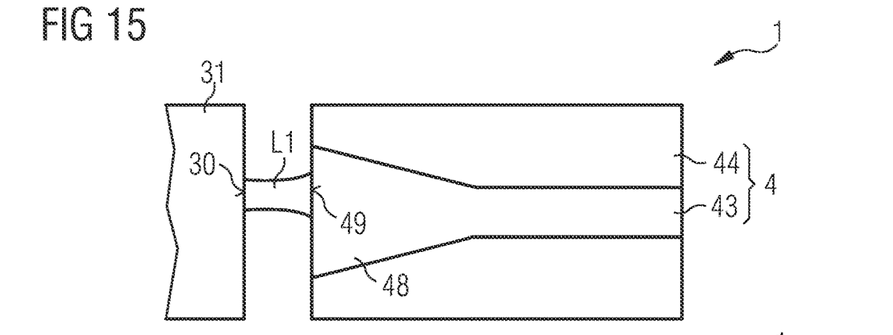
FIGS. 15 to 18 are schematic top views of exemplary embodiments of optoelectronic semiconductor devices described herein.
Figure 16:
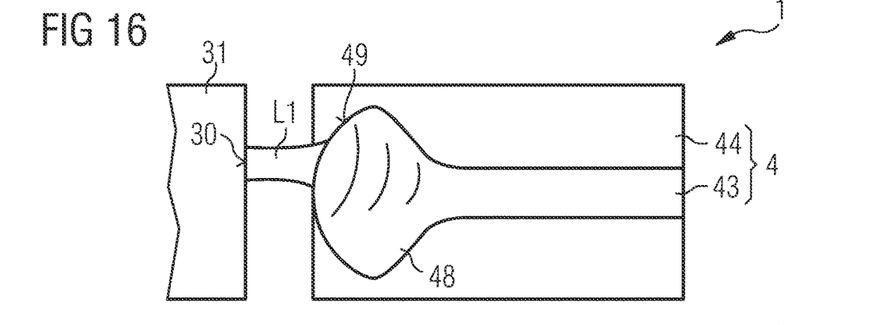
Figure 17:
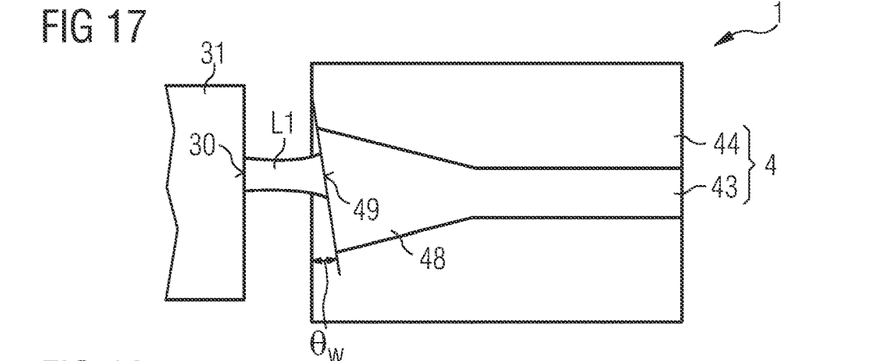

In FIGS. 15 to 17, it is illustrated that the input branches 41 can have input coupling structures 48 which can be of various configurations. Such input coupling structures 48 can also be present in all other exemplary embodiments. For example, such input coupling structures 48 are produced by etching a material of the guidance structures 43 and, thus, can be created in the same method step as the guidance structures 43.

As shown in FIG. 15, the input coupling structure 48 tapers in the direction away from the semiconductor laser 31, 32. For example, seen in top view, the input coupling structure 48 is of trapezoidal shape, and an angle of sides of the trapezoid relative to the longitudinal axis of the assigned input branch 41 is in particular at least 5° and/or at most 35°.

In FIG. 16, the input coupling structure 48 is a lens. For example, a radius of curvature of the lens is at least 5 µm and/or at most 30 µm, and the input branch 41 has, for example, a cross section of at least 2 µm×2 µm and/or of at most 6 µm×6 µm. With such a lens-shaped input coupling structure 48, for example, a lateral positioning tolerance of the semiconductor laser 31, 32 of ±6.0 µm, and an azimuthal tolerance of ±5° may be achieved.

According to FIG. 17, the input face 49 has a non-zero azimuthal tilt angle $\theta_W$. This can be achieved, for example, in two ways: direct etching of the substrate body 44 and of the guidance structure 43, or lapping or etching of the substrate body 44 only, bringing a substrate edge to the off-axis waveguide input face 49, which is defined lithographically. The off-axis coupling method can reduce or eliminate laser feedback and improve coupling efficiency due to the Brewster angle effect of EELs which are usually polarized in the plane of the substrate body 44. Typical angles $\theta_W$ are, for example, at least 5° and/or at most 10°.

A second method to achieve similar performance advantages is to apply anti-reflection coatings to the input face 49 of each input branch 41. As each R, G, and B laser color will have different anti-reflection coating requirements, it is difficult to apply a single anti-reflection coating, such as a quarter-wave $SiO_2$ layer on top of each waveguide input face 49, as they would all require different thicknesses. Therefore, a single multilayer coating with anti-reflection windows at each of the desired wavelengths is preferred.

Figure 18:
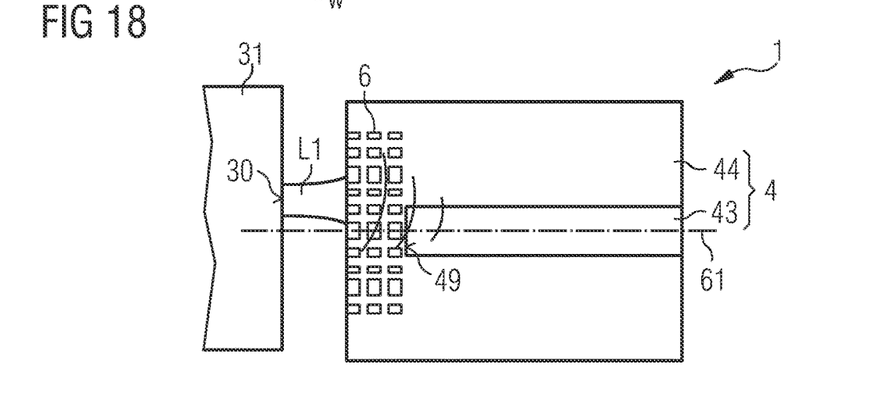

In FIG. 18 another embodiment is shown in which use is made of a 1-dimensional coupling lens as in FIG. 16, but replacing the refractive element with a meta-element. This can alleviate the primary disadvantage of the refractive curved input face 49 which is that the distance from the laser emission region 30 increases as one goes off the optic axis 61. Due to the strong divergence of the laser 31, this reduces coupling efficiency. As with the refractive lens, the meta-lens focuses just inside the multi-mode waveguide 4.

According to FIG. 18, a sub-wavelength lattice of meta-atoms 6 is placed in front of the waveguide input face 49. Each group of meta-atoms 6 forms a meta-lens with a certain focusing power. The meta-lens is designed such that the phase delay introduced by the wider meta-atoms 6 is larger than by the smaller ones. Each lateral area which may be referred to as Fresnel zone corresponds to a $2\pi$ phase shift. This size of the zone determines the effective focal length. By combining at least one or more lenses along the optic axis 61, wherein three lenses are shown in FIG. 18, the input field can be focused into the waveguide face 49, whereby the combined focal length of the compound lenses is such that the effective focal plane is just inside the waveguide input face 49.

Otherwise, the same as for FIGS. 15 to 17 may also apply to FIG. 18, and vice versa.

Figure 19:
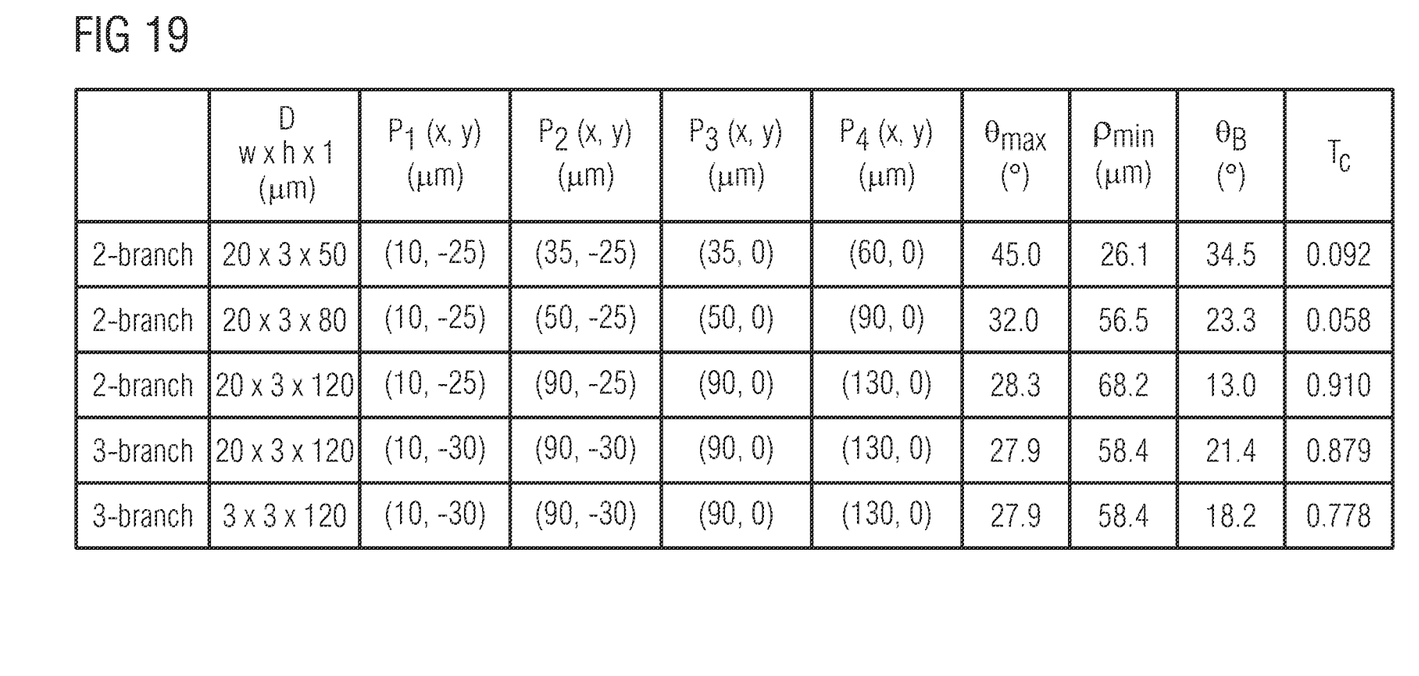
FIGS. 19 to 21 show simulation data for furcations in guidance structures for exemplary embodiments of optoelectronic semiconductor devices described herein.
Figure 20:
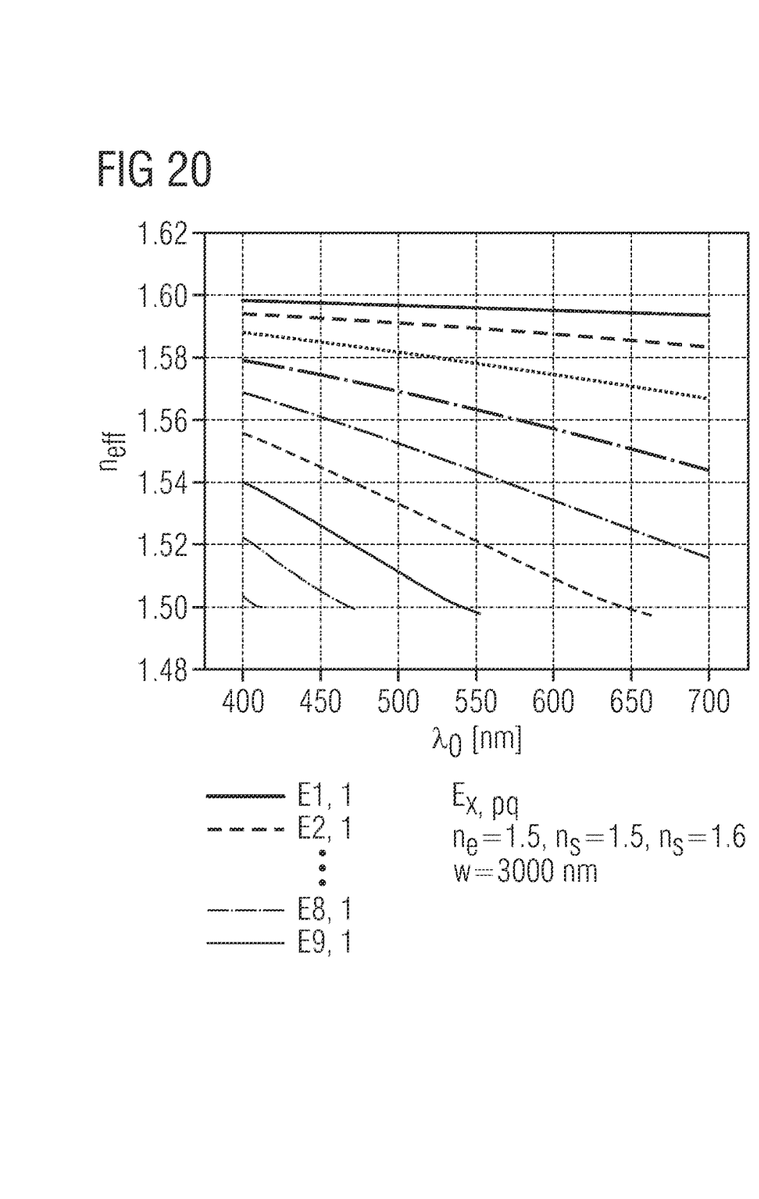
Figure 21:
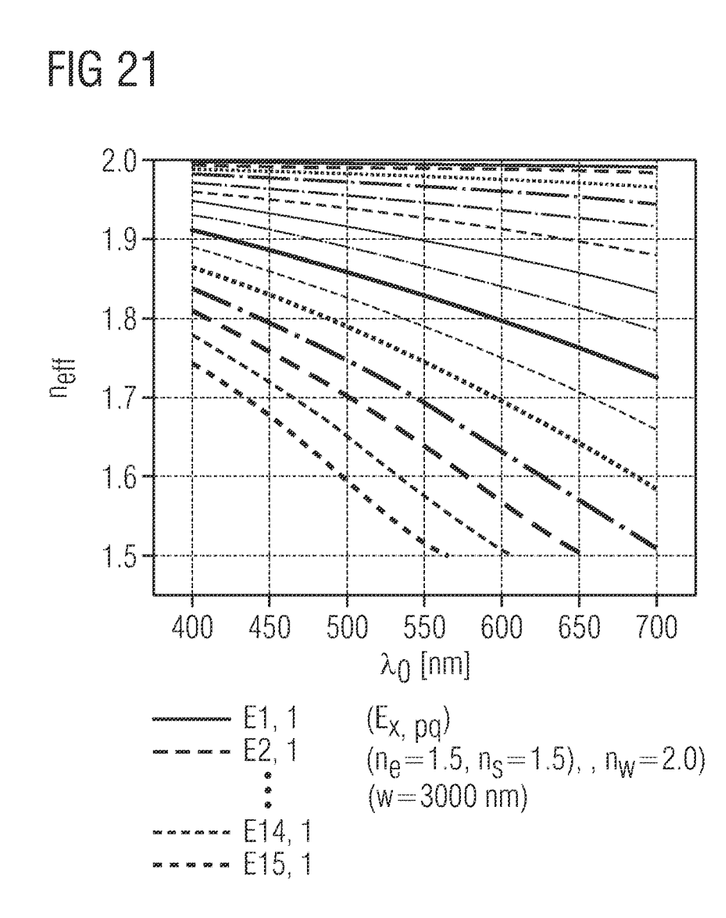

In FIGS. 19 to 21, the S-shape, or S-bend, of the at least one furcation is defined and explained in more detail.

In particular, the S-bend can be parametrized by Bézier curves, where the (x, y) location of the center of the waveguide is given by the following parametric formula, also referred to as Equation (1):

$$B(t) = (x, y) = \sum_{i=1}^{4} \binom{4}{i}(1-t)^{n-i} t^i P_i. \tag{1}$$

In Equation (1), the curves are a function of four control points $P_i = (x_i, y_i)$. The parameter t is varied from 0 to 1 to form the full curve. The coefficient $$\binom{n}{i}$$

is the binomial coefficient of order n.

The table in FIG. 19 shows the S-bend parameters and corresponding coupling efficiencies through the combiner region for a number of simulations. The table displays the waveguide dimensions D, Bézier curve control points P, the maximum slope $\theta_{max}$ of the S-bend, and the minimum radius of curvature $\rho_{min}$. The bend angle $\theta_B$ is the angle of the tangent of the S-bend at the location where the branches meet. This will depend on the waveguide thickness. Finally, the combining efficiency $T_c$ is the ratio of the output power in the output branch to the input power appearing just inside the input branch.

The results show that geometric parameters have a very strong effect on combining efficiency, with only the longest S-bend showing high efficiency. Generally, one considers the minimum radius of curvature in the bend which can lead to loss of confinement and radiative loss. As shown in FIGS. 20 and 21, the highest order modes, which have the least confinement, have high radiative losses. In the case of low index contrast, shown in FIG. 20, the highest order confined mode has significant radiative loss with $\rho_{min} \approx 100$ μm for path lengths on the order of 1 mm. For the higher index contrast waveguides, shown in FIG. 21, many more modes exist and the highest order confined mode has $\rho_{min} \approx 50$ μm for path lengths on the order of 1 mm. Note that the specific values depend on wavelength and mode. But one can see that for the high index contrast guide, the large number of modes implies that only a small fraction of the input field power will overlap the highest order mode, leading to much less overall radiative loss.

Comparing the combining efficiency results in the table with $\rho_{min}$ does correlate with $T_c$ but the difference in $\rho_{min}$ between the 80 μm and 120 μm simulations is very small and seems unlikely to explain the very large difference in $T_c$. In fact, the results quantitatively agree in order of magnitude with the simple calculations in FIGS. 20 and 21. It may also be suspected that the overall bend angle and maximum slope play a role, as these factors relate to the angle at which radiation is "fired" into the combiner region; too high an angle will result in outcoupling of modes otherwise confined in the input branch.

Therefore, in a first embodiment where the maximum wavelength is no more than 620 nm for a 3 μm wide $Si_3N_4$ waveguide on fused silica, the waveguide is specified by overlapping at least 2 branches, at least one having the parametric shape of an S-curve as specified by Equation (1), with a bend angle $\theta_B < 21.5°$ and a maximum slope $\theta_{max} < 30°$. This should also constrain $\rho_{min} > 58$ μm. Of course, similar constraints can be found for other wavelengths and waveguide widths.

Thus, FIG. 20 shows plots of modes and radiative losses for a 3 μm×3 μm ridge waveguide with low refractive index contrast, that is, the substrate, cladding, and core refractive indices are $n_s = 1.5$, $n_c = 1.5$, $n_w = 1.6$. The right-hand plot shows effective refractive index versus horizontal mode number p, with vertical mode number q=1; the left-hand plot shows radiative loss coefficients versus radius of curvature for selected modes at $\lambda_0 = 620$ nm.

FIG. 21 illustrates plots of modes and radiative losses for a 3 μm×3 μm ridge waveguide with high refractive index contrast, that is, the substrate, cladding, and core refractive indices are $n_s = 1.5$, $n_c = 1.5$, $n_w = 2.0$. The right-hand plot shows effective refractive index versus horizontal mode number p, with vertical mode number q=1; the left-hand plot shows radiative loss coefficients versus radius of curvature for selected modes at $\lambda_0 = 620$ nm.

The data provided in FIGS. 19 to 21 may apply to all the exemplary embodiments.

The components shown in the figures follow, unless indicated otherwise, exemplarily in the specified sequence directly one on top of the other. Components which are not in contact in the figures are exemplarily spaced apart from one another. If lines are drawn parallel to one another, the corresponding surfaces may be oriented in parallel with one another. Likewise, unless indicated otherwise, the positions of the drawn components relative to one another are correctly reproduced in the figures.

The optoelectronic semiconductor device described here is not restricted by the description on the basis of the exemplary embodiments. Rather, the optoelectronic semiconductor device encompasses any new feature and also any combination of features, which includes in particular any combination of features in the patent claims, even if this feature or this combination itself is not explicitly specified in the patent claims or exemplary embodiments.

LIST OF REFERENCE SIGNS

1 optoelectronic semiconductor device
2 carrier
21 first connection layer
22 second connection layer
30 emission region
31 first semiconductor laser
32 second semiconductor laser
33 semiconductor layer sequence
34 first metallization
35 laser substrate
4 multi-mode waveguide (PLC)
40 furcation (combination region)
41 first branch facing the semiconductor laser (input)
42 second branch remote from the semiconductor laser (output)

43 guidance structure
44 substrate body
45 additional branch
46 scatter region
47 scatter center
48 input coupling structure
49 input face
52 second metallization
6 meta-atom
61 optic axis
10 glasses
11 temple arm
12 field of vision
C coupling efficiency
D S-bend dimensions
Tc combining efficiency
H height of the guidance structure
$l_B$ bend length
L merged laser radiation
L1 first laser radiation
L2 second laser radiation
LB additional propagation length of the second branch
LO overall length of the guidance structure
$S_L$ separation length
R radius of curvature
$\theta_{max}$ maximum slope
$\rho_{min}$ minimum radius of curvature
W width of the second branch
α radiative loss coefficient
φ azimuthal angle
ψ elevation angle
$\theta_B$ bending angle
$\theta_W$ tilt angle

We claim:

1. An optoelectronic semiconductor device comprising:
   a carrier;
   a first semiconductor laser configured to emit a first laser radiation and applied on the carrier;
   a multi-mode waveguide configured to guide the first laser radiation and also applied on the carrier,
   wherein the multi-mode waveguide comprises at least one furcation and a plurality of branches connected by the at least one furcation;
   a substrate body and a guidance structure protruding from the substrate body;
   a second metallization on a same side of the substrate body as the guidance structure,
   wherein the second metallization is located exclusively laterally displaced relative to the guidance structure, and extends completely along opposing edges of the substrate body.

2. The optoelectronic semiconductor device according to claim 1, further comprising at least one second semiconductor laser configured to emit at least one second laser radiation,
   wherein the multi-mode waveguide comprises at least two first branches configured to receive the first laser radiation and the at least one second laser radiation,
   wherein the at least one furcation is configured to merge the first laser radiation with the at least one second laser radiation to get a merged laser radiation.

3. The optoelectronic semiconductor device according to claim 2,
   wherein the multi-mode waveguide comprises exactly one second branch on a side of the at least one furcation facing away from the first semiconductor laser and the at least one second semiconductor laser, the second branch is configured to emit the merged laser radiation.

4. The optoelectronic semiconductor device according to claim 1,
   wherein the first semiconductor laser comprises a laser substrate and a semiconductor layer sequence as well as a first metallization,
   wherein the semiconductor layer sequence and the first metallization are located on the same side of the laser substrate, and
   wherein the first semiconductor laser is an edge-emitting laser.

5. The optoelectronic semiconductor device according to claim 1,
   wherein the guidance structure is configured to guide the first laser radiation by means of internal total reflection.

6. The optoelectronic semiconductor device according to claim 5,
   wherein the substrate body is attached to the carrier so that the guidance structure and the second metallization face the carrier.

7. The optoelectronic semiconductor device according to claim 6,
   wherein the second metallization projects beyond the guidance structure and is configured to adjust a distance of the guidance structure from the carrier.

8. The optoelectronic semiconductor device according to claim 1,
   wherein the multi-mode waveguide is configured to merge red, green and blue laser radiation, and
   wherein an output region of the multi-mode waveguide has an area of at most 30 μm×30 μm.

9. The optoelectronic semiconductor device according to claim 1,
   wherein the multi-mode waveguide further comprises a scatter region configured to scatter the first laser radiation.

10. The optoelectronic semiconductor device according to claim 9,
    wherein the scatter region is located on a side of the at least one furcation remote from the first semiconductor laser.

11. The optoelectronic semiconductor device according to claim 9,
    wherein the scatter region comprises a plurality of randomly distributed scatter centers.

12. The optoelectronic semiconductor device according to claim 1,
    wherein, seen in top view of the multi-mode waveguide, the at least one furcation is of S-shape so that the at least one furcation is composed of a right-turning bend and of a left-turning bend.

13. The optoelectronic semiconductor device according to claim 12,
    wherein a bending angle of the at least one furcation is at most 21.4°.

14. The optoelectronic semiconductor device according to claim 1, comprising a plurality of the furcations merging with the branches at different locations.

15. The optoelectronic semiconductor device according to claim 1,
    wherein the multi-mode waveguide further comprises an input coupling structure facing the first semiconductor laser,
    wherein the input coupling structure comprises at least one section in which the respective branch narrows in a direction away from the first semiconductor laser.

16. The optoelectronic semiconductor device according to claim 15,
wherein the input coupling structure comprises an input face facing the first semiconductor laser, the input face is tilted relative to a longitudinal axis of the respective branch.

17. The optoelectronic semiconductor device according to claim 1,
wherein a number of branches facing the first semiconductor laser is smaller than or equal to a number of branches located at a side of the at least one furcation remote from the first semiconductor laser,
wherein the multi-mode waveguide is configured as part of an interferometer.

18. Glasses configured for augmented reality or virtual reality applications, comprising:
at least one optoelectronic semiconductor device according to claim 1; and
at least one field of vision illuminated by the at least one optoelectronic semiconductor device.

* * * * *